United States Patent [19]

Stohr et al.

[11] Patent Number: 5,861,872

[45] Date of Patent: Jan. 19, 1999

[54] ADJUSTABLE MOUNTING FOR A POINTING DEVICE

[75] Inventors: Dominique Paul Gabriel Stohr, Kleinboesingen; Emmanuel Charles Gremion, Avry-Devant-Pont, both of Switzerland

[73] Assignee: Logitech, Inc., Fremont, Calif.

[21] Appl. No.: 872,631

[22] Filed: Jun. 10, 1997

Related U.S. Application Data

[63] Continuation of Ser. No. 299,281, Aug. 31, 1994, abandoned.

[51] Int. Cl.⁶ .................................................. G09G 5/00
[52] U.S. Cl. ..................... 345/156; 248/231.61; 248/918
[58] Field of Search .................................. 345/156, 157, 345/163, 167; 248/231.41, 918, 231.31, 231.61

[56] References Cited

U.S. PATENT DOCUMENTS

| | | | |
|---|---|---|---|
| 4,977,397 | 12/1990 | Kuo et al. | 345/163 |
| 5,126,955 | 6/1992 | Tomoda | 345/163 |
| 5,187,468 | 2/1993 | Garthwaite et al. | 345/167 |
| 5,253,836 | 10/1993 | Tso | 248/225.31 |
| 5,268,675 | 12/1993 | Garthwaite et al. | 345/163 |
| 5,281,958 | 1/1994 | Ashmun et al. | 345/157 |
| 5,350,146 | 9/1994 | Chiang | 248/231.4 |
| 5,402,150 | 3/1995 | Stiles | 345/167 |
| 5,426,449 | 6/1995 | Danziger | 345/156 |
| 5,470,040 | 11/1995 | Bhagat et al. | 248/222.4 |
| 5,504,500 | 4/1996 | Garthwaite et al. | 345/157 |

*Primary Examiner*—Amare Mengistu
*Attorney, Agent, or Firm*—Townsend and Townsend and Crew LLP

[57] ABSTRACT

A method and apparatus for attaching a pointing device, such as a mouse, a trackball, a joystick, or the like to an edge of a keyboard or any protruding edge. The apparatus includes a body, a clamping edge adjustably attached to the body, and a movable slide movably attached to the body. The movable slide has a slide face facing the clamping edge such that a gap is formed between the slide face and the clamping edge. One or more springs bias the movable slide against the clamping edge to grip the protruding edge to which the pointing device is attached. The clamping edge can be attached to the body at different positions to accommodate protruding edges of different thickness.

14 Claims, 5 Drawing Sheets

ADJUSTABLE MOUNTING FOR A POINTING DEVICE

This is a Continuation of application Ser. No. 08/299,281, filed Aug. 31, 1994, now abandoned, the disclosure of which is incorporated by reference.

BACKGROUND OF THE INVENTION

The invention relates generally to mounting apparatuses for pointing devices such as trackballs, joysticks, and the like. Specifically, the invention relates to a mounting apparatus which permits the easy attachment and removal of a pointing device to the edge of a keyboard.

In many computer software applications, input data consist of a series of keystrokes on a keyboard. Some applications, however, require the user to manipulate the position of a pointer or cursor on the data screen using a suitable pointing device. The pointing devices usually include a primary data input mechanism for translating the positional data inputted by the operator into digital data for use by the computer, such as the rotation of a ball in the case of a computer mouse or a trackball, or the movement of a joystick, or traces on a touch membrane. In addition to the primary input mechanism, the pointing devices often further include a plurality of input switches to input user commands. The use of pointing devices in the computer art is well known.

In certain situations, it is advantageous to place the pointing device near the keyboard or to attach the pointing device to the keyboard itself. In a typical airline cabin, there is often insufficient space to comfortably accommodate a passenger, a computer and a separate, unattached pointing device. Even when space is not an issue, the computer operator often prefers to attach the pointing device to the keyboard itself. Having the pointing device securely attached to the keyboard advantageously reduces the distance over which the computer operator's hand must travel to switch between the keyboard and the pointing device. Furthermore, as pointing devices get smaller, computer operators often want these miniaturized pointing devices to be more securely attached to a relative stable platform to improve pointing accuracy and ease of handling. The edge of a keyboard, or any protruding edge may be used advantageously to attach such a pointing device.

There is thus desired a simple attachment apparatus for attaching a pointing device to the edge of a keyboard or any protruding edge. The attachment apparatus preferably accommodates a variety of keyboards having different keyboard edge thickness. The attachment apparatus also preferably accommodates a variety of pointing devices. To prevent breakage of the pointing device, the keyboard, or the protruding edge to which the apparatus is attached, there is preferably an integral mechanism for permitting the attachment device to flex and absorb the impact of a sudden force and/or to permit the attached device to safely disengage from the keyboard or the protruding edge to which the pointing device is attached.

SUMMARY OF THE INVENTION

The present invention relates to methods and apparatus for attaching a pointing device to a protruding edge such as an edge of a keyboard. The apparatus includes a body, a clamping edge adjustably attached to the body, a movable slide movably attached to the body, and a spring for biasing the movable slide towards the clamping edge.

In one embodiment, the body further includes a plurality of channels for adjustably attaching the clamping edge to the body. The invention advantageously permits the clamp to adjust itself to grip any edge while maintaining a constant, substantial spring-loaded grip. The channels facilitate discrete or coarse adjustment to accomodate clamping edges of different thickness. The biasing action of the spring loaded movable slide permits the apparatus to finely adjust itself to securely grip an edge. The biasing action further permits the clamp to release its grip and break away when hit. Consequently, damage to equipment and injury to the user is advantageously avoided.

There is optionally provided a shell for receiving the body, the shell having a plurality of slots permitting the clamping edge to adjustably attach to both the shell and the body. In yet another embodiment, there is an optional ergonomic hand rest coupled to the shell for supporting a portion of the user's hand such as the thumb. To improve the amount of friction between the movable slide and the surface of the protruding edge to which the apparatus attaches, one surface of the movable slide may be textured. Alternatively, a plurality of optional frictional pads may be affixed to one surface of the movable slide.

DESCRIPTION OF THE PREFERRED EMBODIMENT

Figure 1:
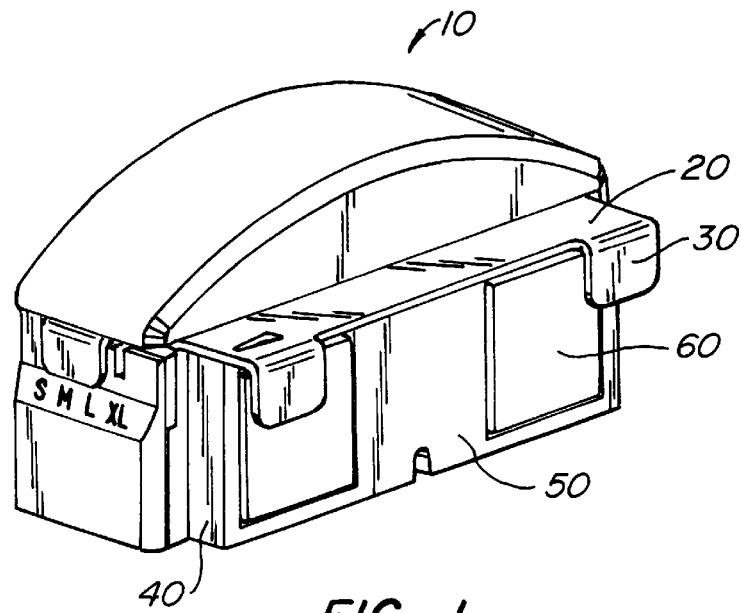
FIG. 1 shows in perspective view an adjustable clamping apparatus according to one aspect of the present invention.

FIG. 1 shows in perspective view an adjustable clamp 10 for attaching a pointing device such as a trackball, a joystick, or the like, to an edge of a keyboard or any protruding edge. Adjustable clamp 10 includes a frame 20 and a plurality of clamping edges 30. Between slide face 50 and clamping edges 30 is a movable slide 40 having a slide face 50 for gripping a keyboard edge (not shown). Slide face 50 further includes a plurality of optional friction pads 60 for improving the gripping ability of adjustable clamp 10.

Figure 2:
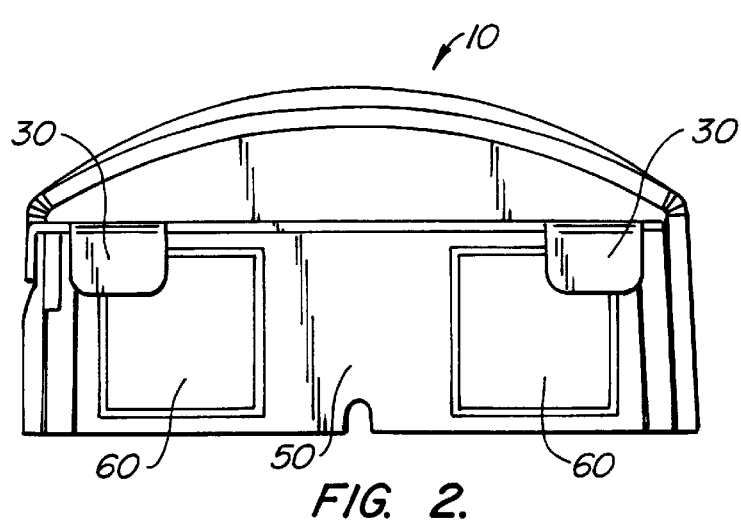
FIG. 2 depicts a front view of the adjustable clamp of FIG. 1.
Figure 3:
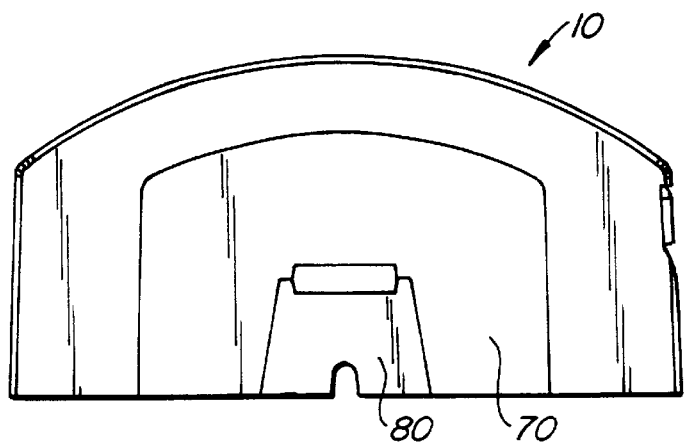
FIG. 3 is a rear view of the adjustable clamp.

FIG. 2 depicts a front view of adjustable clamp 10. In the embodiment of FIG. 2, two clamping edges 30 along with two optional friction pads 60 are shown. FIG. 3 is a rear view of adjustable clamp 10. There is shown in FIG. 3 a mounting member 70 for attaching the actual pointing device to adjustable clamp 10. The configuration of mounting member 70 varies depending on the configuration of the specific pointing device to which adjustable clamp 10 is attached. FIG. 3 further shows an optional mating portion 80. Together with mounting member 70, mating portion 80 ensures the secure attachment of a pointing device to adjustable clamp 10.

Figure 4:
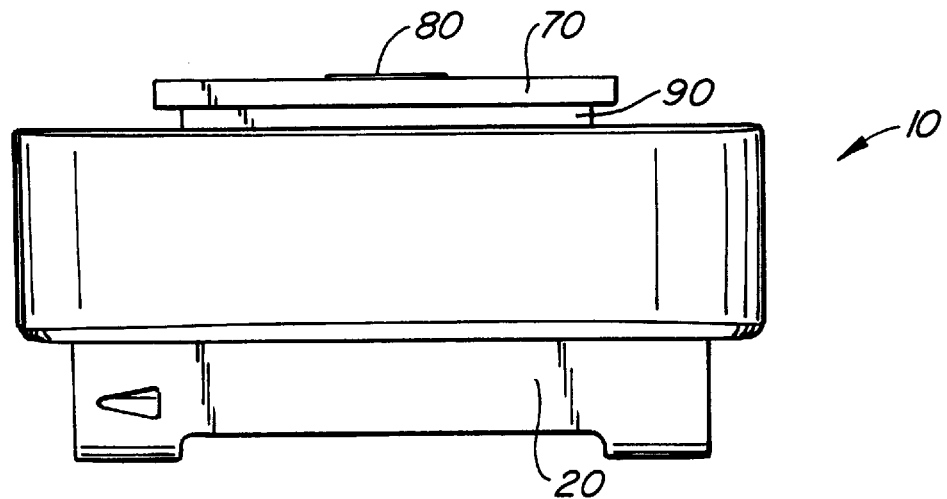
FIG. 4 is a top view of another embodiment of the adjustable clamping apparatus.

FIG. 4 is a top view of adjustable clamp 10. The embodiment of FIG. 4 includes spacing wall 90 between mounting member 70 and the rear wall of adjustable clamp 10. Wall 90 strengthens adjustable clamp 10 and permits mounting member 70 to be spaced some distance from the rear wall of adjustable clamp 10 to facilitate the attachment of a pointing device.

Figure 5:
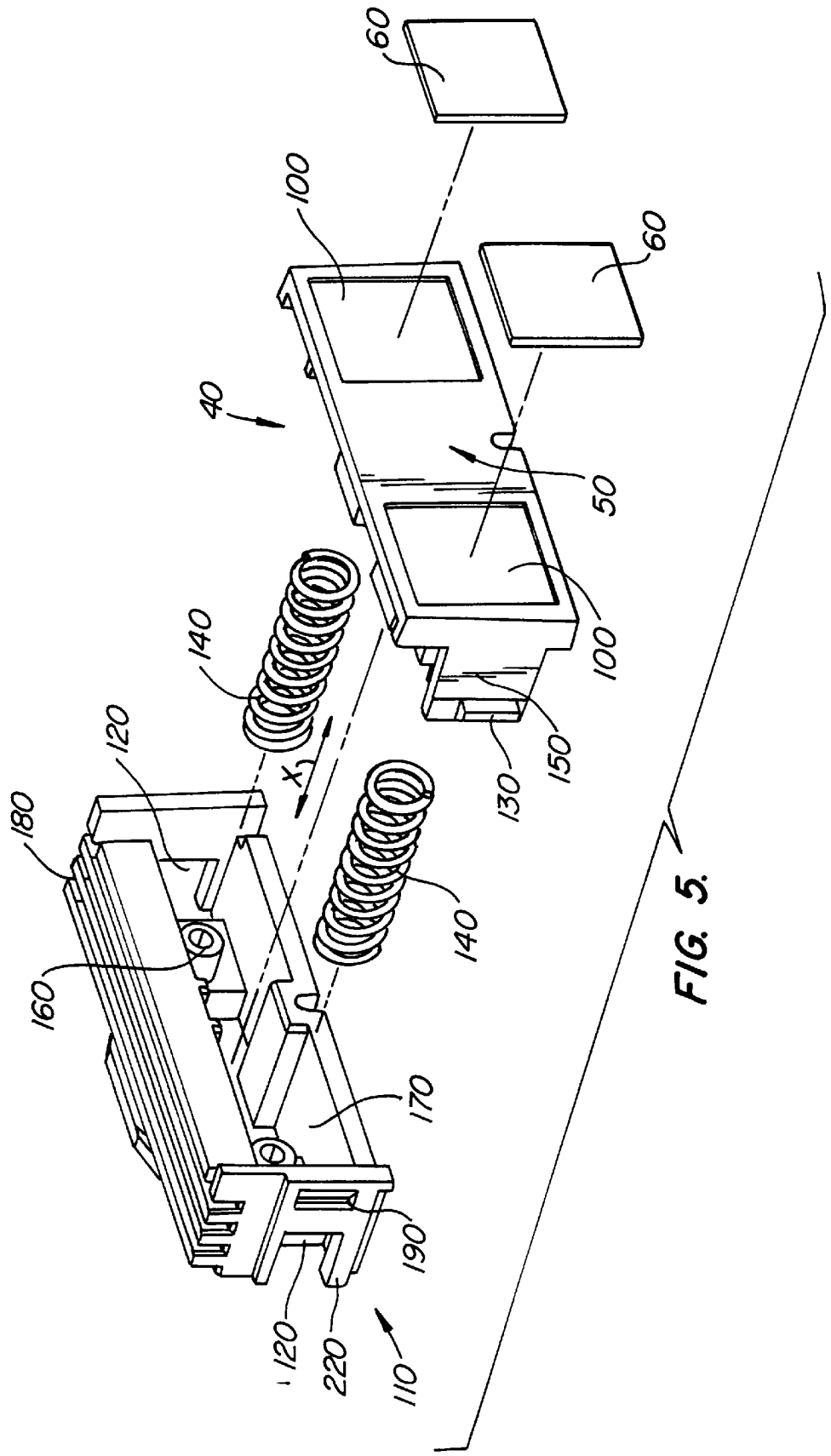
FIG. 5 is an exploded view of the adjustable clamping apparatus.

In FIG. 5, there is shown an exploded view of adjustable clamp 10 including movable slide 40, slide face 50 and two optional friction pads 60. Friction pads 60 are made of a griping material such as rubber, neoprene, or the like. Friction pads 60 are securely attached with adhesive to slide face 50 at pad receiving areas 100. It should be noted that although two friction pads 60 are shown in the embodiment of FIG. 5, adjustable clamp 10 can be constructed without utilizing any friction pad. This is particularly true if slide face 50 is made from a material which has a sufficiently high coefficient of friction with respect to the edge of the keyboard to which adjustable clamp 10 is attached. Furthermore, the surface of slide face 50 can be textured to increase the gripping ability of adjustable clamp 10. In such instances, optional pads 60 may be omitted. Alternatively, it will be apparent to those of skill in the art to recognize that a single friction pad 60 or a plurality of friction pads 60 having different sizes may be used to increase the amount of friction between the adjustable clamp of the present invention and an edge of a keyboard.

FIG. 5 also shows a core 110 for receiving movable slide face 40. Core 110 has a plurality of notches 120 to mate with ribs 130 of movable slide 40. The embodiment of FIG. 5 also shows two coiled springs 140, which are disposed between core 110 and movable slide 40. Springs 140 are dimensioned such that when movable slide 40 is inserted into core 110, and ribs 130 engage notches 120, the springs are partially compressed. Notches 120 have a certain depth that permit ribs 130 to travel a certain distance in the direction indicated by arrow X to further compress springs 140.

Figure 6:
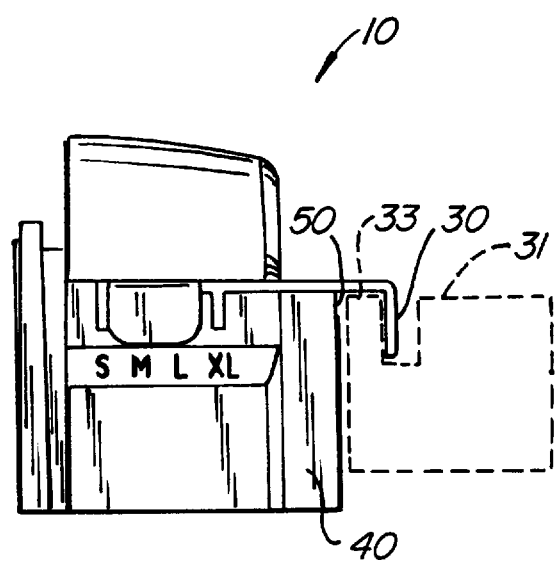
FIG. 6 is a left side view of the adjustable clamp.

The movement of ribs 130 in notches 120 permits movable slide 40 to move a limited distance towards core 110 and to increase the gap formed between slide face 50 and clamping edges 30. FIG. 6 is a left side view of adjustable clamp 10 showing clamping edges 30, slide face 50, and the gap therebetween. Increasing the gap between slide face 50 and clamping edges 30 facilitates the attachment of adjustable clamp 10 to the keyboard edge. Note that it is not necessary for both ribs 130 of movable slide 40 to move parallelly within respective notches 120. In fact, each of springs 140 is permitted to be compressed independently of the others to allow movable slide 40 to flex with respect to core 110 to advantageously absorb the force of a blow.

Clamping edge 30 in FIG. 6 is shown extending over a protruding edge 33 of a computer system keyboard 31.

When released, springs 140 force movable slide 40 away from core 110, thereby causing adjustable clamp 10 to grip a keyboard edge between slide face 50 and clamping edges 30.

FIG. 5 also shows protrusions 160 for positioning springs 140 within a cavity 170 of core 110. Although two springs 140 are used in the present embodiment, any number of springs 140 may be used. Furthermore, other types of biasing mechanisms, such as leaf springs, may be substituted for coiled springs 140 without departing from the scope and spirit of the present invention.

A plurality of channels 180 on core 110 are also shown in FIG. 5. Each of channels 180 is used to engage a lip of frame 20 (shown in FIG. 7) for adjusting clamp 10 to accommodate keyboards of different keyboard edge thickness.

Figure 7:
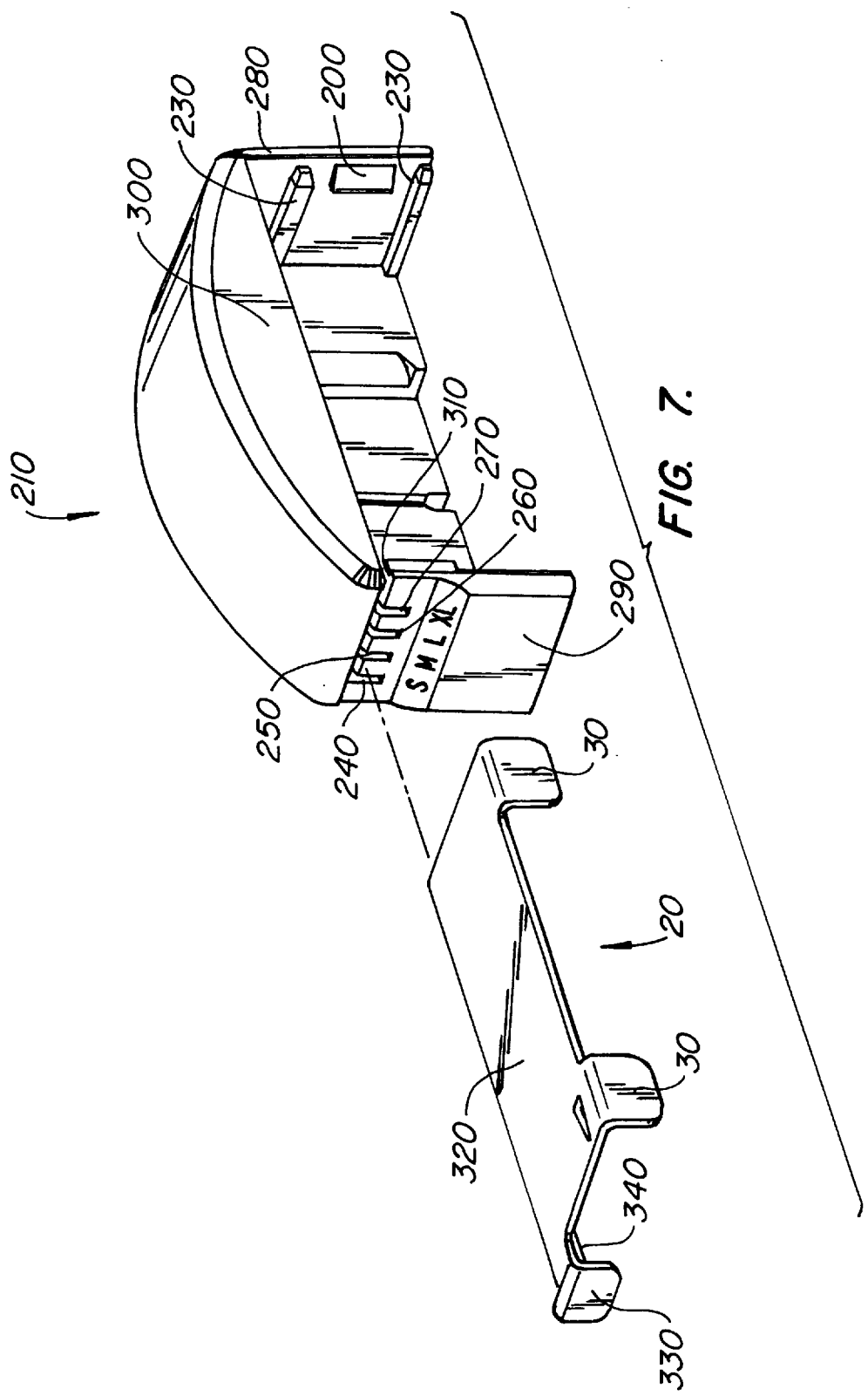
FIG. 7 shows a shell and a frame for use with the adjustable clamp according to another aspect of the present invention.

FIG. 7 shows mating ribs 200 in shell 210 of adjustable clamp 10. Mating ribs 200 engage respective mating notches 190 on core 110 of FIG. 5. To clip core 110 (shown in FIG. 5) onto shell 210, core 110 is positioned such that mating members 220 on core 110 fit between rail members 230 of shell 210. When core 110 is pushed into the recess within shell 210, rail members 230, mating members 220, mating notches 120 and mating ribs 200 securely hold core 110 within shell 210. Furthermore, mating ribs 200 and mating notches 190 are positioned such that when core 110 is clipped onto shell 210, channels 180 on core 110 line up with slots 240–270 on shell 210.

Shell 210 includes two side walls 280 and 290 as well as a top member 300. Top member 300 has a contoured surface designed to support a portion of the user's hand, e.g. the thumb, during use. There is a gap 310 between top member 300 and side wall 290 of shell 210 to facilitate the insertion of frame 20 into shell 210.

Frame 20 has a frame top 320 which fits in gap 310 between top member 300 and side wall 290 of shell 210. As discussed in connection with FIG. 1, frame 20 has two clamping edges 30 for engaging with the inner edge of the keyboard to which the adjustable clamp of the present invention is attached. Although the present embodiment shows two clamping edges 30 attached to frame 20, the adjustable clamp of the present invention is not so limiting. An adjustable clamp may be constructed with only one oversized edge 30 attached to frame 20, or any number of clamping edges 30 attached perpendicular to frame top 320 for engaging with a keyboard edge. There is also shown on frame 20 an optional tab 330 for aiding in the insertion and removal of frame 20 from gap 310 of shell 210.

Figure 8:
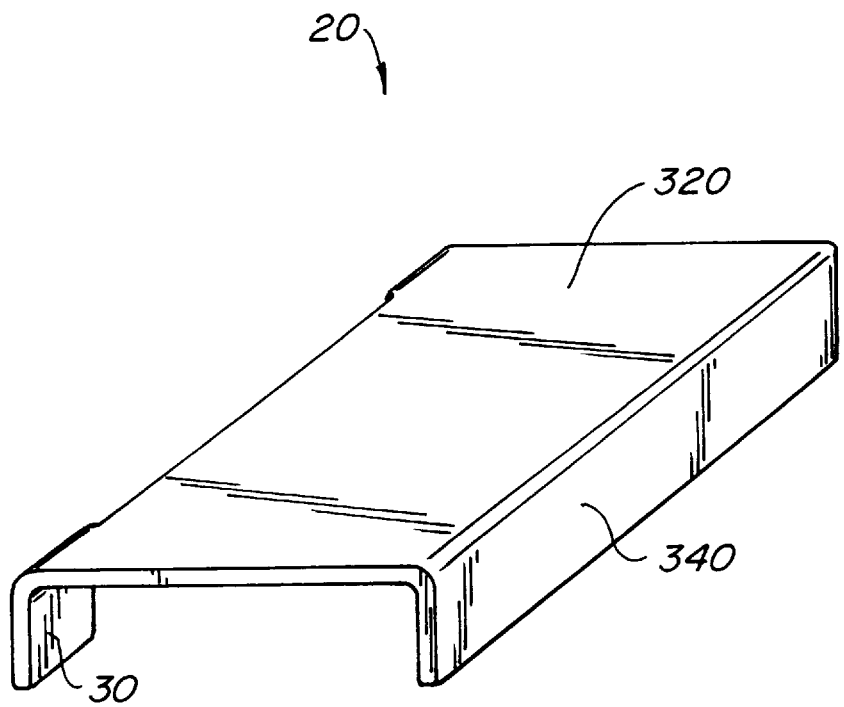
FIG. 8 shows another view of the frame depicted in FIG. 7.

FIG. 8 shows another view of frame 20. As discussed earlier, clamping edges 30 are attached to frame top 320 of frame 20. Also shown is a mating lip 340 attached to frame top 320 for inserting into and engaging one of slots 240–270 on shell 210 and one of channels 180 on core 110. Although FIG. 8 shows an embodiment of frame 20 having a mating lip 340 spanning the entire length of frame 20, it should be apparent that some portion of mating lip 340 may be cut away to reduce weight and material without any loss of functionality.

To assemble the adjustable clamp of the present embodiment, friction pads 60 are attached to slide face 50 of movable slide 40 at pad receiving areas 100. Springs 140 are positioned in cavity 170 of core 110. Movable slide 40 is then inserted into core 110 until ribs 130 of movable slide 40 engage notches 120 of core 110. As discussed, when ribs 130 engage notches 120, springs 140 become partially compressed. Core 110 is inserted into shell 210 of FIG. 7 until mating ribs 200 of shell 210 engage mating notches 190 of core 110. When mating ribs 200 of shell 210 engage mating notches 190 of core 110, one of channels 180 lines up with one of slots 240–270. Depending on the width of the keyboard edge to which the adjustable clamp is attached, mating lip 340 is inserted into either slot 240, slot 250, slot 260, or slot 270. In the present embodiment, when frame 20 is inserted into slot 240, the adjustable clamp can accommodate a keyboard having an edge thickness of 1 mm to 4.5 mm. At slot 250, the adjustable clamp can accommodate a keyboard having an edge thickness of 3.5 mm to 7.0 mm; at slot 130, a keyboard edge thickness of 6.0 mm to 9.5 mm; and at slot 140, a keyboard edge thickness of 8.5 mm to 12.0 mm. However, the location of slots 240–270 and channels 180 may be changed to accommodate keyboards having thinner or thicker keyboard edge thickness.

As discussed earlier, the gap between clamping edges 30 and slide face 50 changes when movable slide 40 and ribs 130 move in cavity 170 and notches 120. When movable slide 40 is compressed against core 110, springs 140 are partially compressed. When released, the pressure exerted by compressed springs 140 help clamp the edge of a keyboard between movable slide 40 and clamping edges 30.

To attach the adjustable clamp of the present invention to a keyboard, the user first inserts frame 20 into an appropriate slot 240–270. Next, adjustable clamp 10 is positioned with slide face 50 pressed against the outer edge of a keyboard at the approximate position where the clamp will eventually be attached. The user then presses adjustable clamp 10 against the side of the keyboard so that springs 140 are further compressed within cavity 170 of core 110. Pressing movable slide 40 against the side of the keyboard and compressing springs 140 widens the gap between slide face 50 and clamping edges 30 of the assembled adjustable clamp.

Thereafter, the user slides the adjustable clamp down while keeping springs 140 compressed until the edge of the keyboard is positioned between clamping edges 30 and slide face 50. Releasing the pressure on springs 140 causes moveable slide 40 to move toward clamping edges 30, thereby clamping the edge of the keyboard between slide face 50 and clamping edges 30. If optional friction pads 60 are installed, the edge of the keyboard is clamped between pads 60 and clamping edges 30. The pointing device itself could be attached to adjustable clamp 10 prior to or after adjustable clamp 10 is attached to the keyboard.

To remove adjustable clamp 10 from the keyboard, the above steps are reversed. First, the user presses the adjustable clamp against the outer edge of the keyboard. Springs 140 are compressed causing the gap between clamping edges 30 and slide face 50 to widen. The user can then glide adjustable clamp 10 up, until the edge of the keyboard is no longer positioned between clamping edges 30 and slide face 50. Adjustable clamp 10 can then be removed.

Note that the adjustable clamp of the present invention advantageously flexes to prevent breakage should a sudden force be applied to the clamp or to the attached pointing device. A sudden force may result from different sources, e.g., dropping the keyboard on the floor, knocking the clamp/pointing device assembly with one's arm, or dropping objects on the clamp/pointing device assembly. When a sudden force is applied, one or both of springs 140 are compressed, absorbing some of the force and permitting adjustable clamp 10 to yield. Excessive force, which exceeds the gripping power of adjustable clamp 10, will cause adjustable clamp 10 to pop off the edge of the keyboard, thereby preventing permanent damage to clamp 10, the attached pointing device, or the keyboard. It should be noted that adjustable clamp 10 flexes and/or pops off the keyboard regardless of the direction from which force is applied.

It should be apparent to those of skill in the art that although a keyboard edge is the preferred attaching site for the adjustable clamp of the present invention, adjustable clamp 10 may be attached advantageously to any protruding edge having an appropriate thickness. The protruding edge itself may be vertical, horizontal, or at an angle with respect to a horizontal surface.

The reference to the keyboard in the specification should be understood to be merely illustrative of the operation of the adjustable clamp and does not serve to limit its range of application. Likewise, the shell may be omitted without departing from the scope and spirit of the invention. Without the shell, frame 20 may be mounted directly on core 110. The pointing device is then mounted directly on core 110.

Furthermore, conventional fasteners may be used to attach movable slide 40 to core 110 and/or shell 210. It will be apparent to those of skill in the art that notches and mating members may substitute for channels 180 and mating lip 340 while still permitting frame 20 to be adjustably attached to core 110. In the absence of shell 210, ergonomic hand rest top member 300 may be mounted directly on core 110.

As discussed, various modifications can be made by those skilled in the art without departing from the scope and spirit of the invention. Accordingly, the foregoing disclosure is intended to be illustrative, but not limiting, of the scope of the invention which is set forth in the following claims.

What is claimed is:

1. A clamping apparatus for attaching to a protruding edge in a computer system, said apparatus comprising:
    a clamp body;
    a frame having a clamping edge for extending over said protruding edge, said frame being adjustably attachable to said clamp body at a plurality of positions for varying widths of said protruding edge;
    a movable slide having a slide face for engaging a side of said protruding edge, said movable slide being movably attached to said clamp body; and
    a spring for biasing said movable slide toward said clamping edge.

2. The apparatus of claim 1 wherein said clamp body comprises a plurality of channels for adjustably attaching said frame to said clamp body.

3. The apparatus of claim 1 further comprising a shell for receiving said clamp body, said shell having a plurality of slots permitting said frame to adjustably attach to both said shell and said clamp body.

4. The apparatus of claim 3 further comprising an ergonomic hand rest coupled to said shell.

5. The apparatus of claim 1 further comprising a friction pad attached to said slide face.

6. The apparatus of claim 1 wherein said slide face is textured.

7. The apparatus of claim 1 further comprising an ergonomic hand rest coupled to said clamp body.

8. An apparatus for clamping to a protruding edge in a computer system, comprising:
    a frame comprising a clamping edge and a mating edge;
    a clamp body having a plurality of channels, said mating edge adjustably engaging with one of said channels;
    a movable slide movably attached to said clamp body, said movable slide having a slide face facing said clamping edge, said slide face and said clamping edge forming a gap for engaging a side of said protruding edge; and
    a spring for biasing said slide face on said movable slide toward said clamping edge.

9. The apparatus of claim 8 further comprising a friction pad mounted on said slide face.

10. The apparatus of claim 9 comprising means for flexing said slide face laterally relative to said clamp body.

11. The apparatus of claim 10 further comprising a shell coupled to said clamp body, said shell having a plurality of slots permitting said mating edge to adjustably engage with one of said slots and one of said channels.

12. The apparatus of claim 11 wherein said frame further comprising a frame top attached to said clamping edge and said mating edge, said frame top slidably inserts into a gap in said shell.

13. The apparatus of claim 12 wherein said shell further comprises an ergonomic hand rest coupled to said shell.

14. A method for attaching a clamping apparatus to a protruding edge in a computer system, said method comprising the steps of:

provided a clamp body;

movably attaching a movable slide to said clamp body, said movable slide being biased away from said clamp body;

adjustably attaching a clamping edge to said clamp body, wherein said clamping edge and said movable slide form a gap for engaging said protruding edge, said gap being enlarged when a force is applied to bias said movable slide toward said clamp body, said gap being narrowed when said force is released.

* * * * *